United States Patent Office 3,042,582
Patented July 3, 1962

3,042,582
MITOMYCIN RECOVERY FROM FERMENTATION BROTH
Alexander Gourevitch and Bernard Chertow, Syracuse, and Joseph Lein, Fayetteville, N.Y., assignors, by mesne assignments, to Bristol-Myers Company, New York, N.Y., a corporation of Delaware
No Drawing. Filed Dec. 11, 1958, Ser. No. 779,520
7 Claims. (Cl. 167—65)

This invention relates to an improvement in methods for the production of mitomycin. The invention is particularly related to a process for preventing the destruction by mitase of mitomycin in whole fermentation broths by the use of a mitase inhibitor, e.g. sodium lauryl sulfate.

Mitomycin is a known antibiotic having several identifiable fractions which have been designated in the literature as mitomycins A, B, C, Y and R, all of which are colored and are biologically active. The physical, chemical and biological properties, the preparation of the various known uses of mitomycins are all described in the literature; see "Mitomycin, a New Antibiotic From Streptomyces, I," The Journal of Antibiotics (Japan), Series A, vol. IX, No. 4: 141–146, July 1956; Sugawara and Hata, "Mitomycin, a New Antibiotic From Streptomyces, II, Description of the Strain," the Journal of Antibiotics (Japan), vol. IX, No. 4: 147–151, July 1956; Kanamori et al., "Studies on the Antitumor Activity of Mitomycin," The Journal of Antibiotics (Japan), Series A, vol. 10: 120–127, May 1957; Wakaki et al., "Isolation of New Fractions of Antitumor Mitomycin," Antibiotics and Chemotherapy, vol. VIII: 228–240, May 1958.

The commercial production of mitomycin involves the preparation of mitomycin-containing broths by culturing a mitomycin-producing organism, e.g. *Streptomyces caespitosus*, in suitable media as described at length in the literature. At the end of the fermentation cycle the whole broth is usually centrifuged, filtered or otherwise treated to separate the solids (mycelia) from the supernatant which contains substantially all of the antibiotic activity. In commercial processes there is usually a period of time intervening between the end of the fermentation cycle and the time at which the mycelia is actually removed from the both; such a period may range from several minutes to several hours in length and may be due to a number of factors, e.g. the time necessary to conduct the actual centrifugation or filtration of large quantities of broth, or the time involved in waiting for equipment to become available for use. In the commercial preparation of mitomycin, the mitomycin-containing whole broths decrease rapidly in potency during the time following the completion of the fermentation cycle and prior to the removal of the mycelia. It has been observed that a whole broth will lose substantially all of its mitomycin activity within about six hours at room temperature and within about 24 hours at 10° C. A clear supernatant obtained by the centrifugation of the same broth shows no loss of activity under such conditions.

We have now discovered that the mycelia produced by mitomycin-producing organisms contains a substance which has the property of inactivating or destroying mitomycin. This substance has been called "mitase" and will be so referred to throughout this specification.

It is an object of the present invention to provide a process for the stabilization of mitomycin in whole broth. It is a more specific object of the invention to provide a process for preventing the destruction of mitomycin by mitase in whole broth by the addition to the whole broth of a mitase inhibitor. It is a particular object of the invention to provide a simple and economical process for the inhibition of mitase and to provide inexpensive and readily available mitase inhibitors. Further objects and advantages of the invention will appear as the specification proceeds.

We have discovered that the deleterious effect of mitase upon mitomycin in whole broths can be reduced or eliminated by adding a mitase inhibitor to the whole broth. Several exemplary mitase inhibitors, such as chloroform, mercuric chloride, toluene and alkali metal alkyl sulfates, are disclosed in the following discussion and examples. Other mitase inhibitors may be identified by experimentation analogous to that disclosed in this specification. Of the mitase inhibitors, we prefer to use sodium or potassium alkyl sulfates or mixtures thereof wherein the alkyl group has from eight to eighteen carbon atoms. The preferred mitase inhibitor is sodium lauryl sulfate. Many other mitase inhibitors of lesser effectiveness are listed below in the several examples. In the process of this invention the mitase inhibitor is added to the broth at or near the time of harvesting which occurs at the end of the fermentation cycle, e.g., shortly prior to or at the time of the cessation of aeration of the broth. The quantity of the preferred mitase inhibitor, sodium lauryl sulfate, used in the process is desirably about 0.1% by weight of the broth. Larger amounts of sodium lauryl sulfate, i.e., amounts in excess of about 0.5% by weight of the broth, though effective, are little or no more effective in preventing the destruction of mitomycin than amounts ranging from about 0.1% to 0.5%. The effect of the mitase inhibitors can be enhanced by chilling the mitomycin-containing broth immediately after harvest and by maintaining the broth at or near harvest pH.

In an experiment demonstrating the presence of mitase in mycelia, mitomycin-containing whole broth was harvested on the seventh day of fermentation and was divided into three equal parts. One part of the whole broth was used as a control and was identified as sample I. A second part was centrifuged, the solids discarded and a small amount of solid mitomycin was added to the supernatant which was identified as sample II. The third portion of the broth was centrifuged, the supernatant discarded and the solids, i.e., mycelia, washed twice with an aqueous saline solution; the mycelia was then resuspended in a 0.1 molar phosphate buffer solution at pH 7 and a small amount of solid mitomycin added to the suspension which was identified as sample III. Samples IV, V and VI were prepared in the same manner as samples I, II and III, respectively, except that the initial broth was obtained from a mitomycin-containing broth harvested on the eighth day of the fermentation. The samples were assayed immediately after their preparation and again after standing for 24 hours at room temperature. The assay results are as follows:

| Sample | Treatment | Potency (mcg./ml.) | |
|---|---|---|---|
| | | 0 Hours | 24 Hours |
| I | Whole broth control, centrifuged at time of assay | 17.6 | 11.5 |
| II | Supernatant and solid mitomycin | 37.8 | 52.2 |
| III | Suspended, washed mycelia plus solid mitomycin | 24.3 | 0.0 |
| IV | Whole broth control, centrifuged at time of assay | 22.6 | 12.6 |
| V | Supernatant plus solid mitomycin | 50.8 | 51.3 |
| VI | Suspended, washed mycelia plus solid mitomycin | 28.8 | 15.3 |

It is apparent from the data that the potency of each of the samples which contain mycelia is reduced over the 24-hour period, while samples II and V which contain no mycelia do not lose potency over the 24-hour period. Thus it is indicated that mycelia contains or produces a substance (mitase) which inactivates mitomycin.

In another experiment a sample of seven-day-old whole fermentation broth containing mitomycin was centrifuged and the solid material, i.e., mycelia, was washed with saline solution. The washed mycelia was then divided into two portions which were identified as portion No. 1 and portion No. 2. Portion No. 1 was boiled in water for 30 minutes while portion No. 2 was maintained at room temperature. After portion No. 1 was cooled, each portion was made up to 30 ml. in a separate flask with 0.1 molar phosphate buffer at pH 7. A small portion of solid mitomycin was added to each flask. The flasks were then placed in a 37° C. water bath. Samples were taken from each flask after various periods of time and were assayed for mitomycin activity. The results of the several assays are set forth below:

| Time in Water Bath, Hours | Potency in mcg./ml. | |
|---|---|---|
| | Suspension of Boiled Mycelia with Mitomycin | Suspension of Unboiled Mycelia with Mitomycin |
| 0.0 | 4.95 | 5.4 |
| 0.25 | 5.7 | 3.7 |
| 0.50 | 5.1 | 1.2 |
| 1.0 | 5.4 | 0.5 |
| 2.0 | 6.0 | 0 |
| 3.0 | 6.6 | 0 |
| 4.0 | 4.65 | 0 |
| 5.0 | 4.95 | 0 |

The data indicates that mycelia contains a substance which inactivates mitomycin and which is itself inactivated by boiling. The data also shows that mitomycin is totally inactivated at 37° C. in one hour while the previous experiment (described above) shows that at room temperature mitomycin is not always completely inactivated over a 24-hour period.

In the foregoing experiments and in the following examples, the potency of the mitomycin-containing broths is, unless otherwise indicated, measured in micrograms of mitomycin per milliliter of broth by the diffusion plate assay method (see U.S. Patent No. 2,739,924) using *Klebsiella pneumoniae* as the test organism.

EXAMPLE I

Several identical samples of mitomycin-containing whole broth were obtained. Sample I, which represented the full potency of the broth, was centrifuged, the supernatant was immediately assayed for mitomycin activity and the initial mitomycin activity of the broth was thereby determined. The residual potency of the broth after destruction of part of the mitomycin by the mitase of the mycelia was next determined in a second sample of the whole broth which was heated for one hour at 37° C. then centrifuged and the supernatant assayed. The effect of mercuric chloride and 8-hydroxyquinoline on mitase was determined by the addition of 0.025 percent by weight of mercuric chloride and 8-hydroxyquinoline to the third and fourth samples, respectively, of the whole broth. After addition of the reagents the samples were heated for one hour at 37° C. then extracted with butanol to remove the mitomycin activity. Each extract was then stripped of the organic solvent, reconstituted with water and assayed. It was found that the destructive effect of the mitase upon mitomycin had been inhibited by the mercuric chloride and the full mitomycin potency of the broth had been retained despite the mild heating in the presence of mycelia. The assay results are set forth in Table I.

*Table I*

| Sample | Treatment | Potency (mcg./ml.) |
|---|---|---|
| I | Whole broth, less mycelia, assayed immediately. | 35.0 |
| II | Whole broth held at 37° C. for one hour, then assayed. | 1.5 |
| III | Whole broth plus 0.025% by weight HgCl$_2$, held at 37° C. then mitomycin extracted and assayed. | 35.0 |
| IV | Whole broth plus 0.025% by weight of 8-hydroxyquinoline, held at 37° C. for one hour, mitomycin extracted and assayed. | 2.5 |

EXAMPLE II

The effectiveness of several mitase inhibitors was measured in an experiment in which several identical samples of mitomycin-containing whole broth were obtained. The full potency of the whole broth was represented by sample I which was prepared by centrifuging whole broth, discarding the solids and immediately assaying the supernatant. The residual potency of the broth after destruction of part of the mitomycin by mitase was next determined in a second sample (identified as Sample II) of the whole broth which was heated for one hour at 37° C., then centrifuged and the supernatant assayed. The remaining samples were treated exactly as was sample II with the exception that various mitase inhibitors were added to the broth prior to heating in the amounts specified in Table II. The assay results are set forth below in Table II.

*Table II*

| Sample | Treatment | Potency (mcg./ml. |
|---|---|---|
| I | Whole broth less mycelia, assayed immediately. | 35.0 |
| II | Whole broth held at 37° C. for one hour, then assayed. | 2.8 |
| III | Whole broth plus 0.1% Na iodoacetate, held at 37° C. for one hour, then assayed. | 5.4 |
| IV | Whole broth plus 0.1% phenol, held at 37° C. for one hour, then assayed. | 12.5 |
| V | Whole broth plus 0.1% NaF, held at 37° C. for one hour, then assayed. | 3.3 |
| VI | Whole broth plus 0.1% picolinic acid, held at 37° C. for one hour, then assayed. | 4.2 |
| VII | Whole broth plus 0.5% sodium malonate, held at 37° C. for one hour, then assayed. | 3.7 |
| VIII | Whole broth plus 1% toluene, held at 37° C. for one hour, then assayed. | 35.0 |
| IX | Whole broth plus 1% CHCl$_3$, held at 37° C. for one hour, then assayed. | 27.0 |
| X | Whole broth plus 0.1% EDTA, held at 37° C. for one hour, then assayed. | 6.5 |
| XI | Whole broth plus 0.1% KCN, held at 37° C. for one hour, then assayed. | 3.2 |

EXAMPLE III

The effectiveness of a group of substances in the inhibition of mitase in whole broth was determined in an experiment conducted in the same manner as in Example II. The assay results are set forth below:

Table III

| Sample | Treatment | Potency (mcg./ml.) |
|---|---|---|
| I | Whole broth less mycelia, assayed immediately. | 32.7 |
| II | Whole broth held at 37° C. for one hour, then assayed. | 6.6 |
| III | Whole broth plus 0.01% sorbitan monostearate (Tween 60), held at 37° C. for one hour, then assayed. | 4.9 |
| IV | Whole broth plus 0.001% Polyoxyethylene (20) sorbitan mono-oleate (Tween 80), held at 37° C. for one hour, then assayed. | 7.8 |
| V | Whole broth plus 0.1% cetyltrimethylammonium bromide, held at 37° C. for one hour, then assayed. | 18.8 |
| VI | Whole broth plus 0.01% cetyltrimethylammonium bromide, held at 37° C. for one hour, then assayed. | 6.4 |
| VII | Whole broth plus 1% urea, held at 37° C. for one hour, then assayed. | 4.1 |
| VIII | Whole broth plus 0.1% sodium dehydroacetate, held at 37° C. for one hour, then assayed. | 5.2 |
| IX | Whole broth plus 0.1% propyl parahydrobenzoate, held at 37° C. for one hour, then assayed. | 16.8 |
| X | Whole broth plus 0.01% propyl parahydrobenzoate, held at 37° C. for one hour, then assayed. | 6.1 |
| XI | Whole broth plus 0.1% sodium lauroyl sarcocide, held at 37° C. for one hour, then assayed. | 4.1 |
| XII | Whole broth plus 0.01% sodium lauroyl sarsarcocide, held at 37° C. for one hour, then assayed. | 8.6 |

EXAMPLE IV

A portion of whole broth resulting from the fermentation of mitomycin-producing organisms was taken from a fermentation vessel at the end of the fermentation cycle and divided into five equal samples which were subjected to various treatments.

Sample I was centrifuged, the solids discarded and the supernatant was held for assay under refrigeration without further treatment. Sample II was untreated and contained all materials (mycelia and metabolic products) resulting from the fermentation process. Sodium lauryl sulfate (SLS) amounting to 0.1% by weight of the broth was added to sample III which, except for the addition of the sodium lauryl sulfate, was identical in composition to sample II. To sample IV there was added 0.5% by weight of sodium lauryl sulfate. Sample V was simply adjusted to pH 10. Samples II through V were then incubated at 37° C. for one hour and thereafter were assayed for mitomycin using *Klebsiella pneumoniae*. The results of the assay are as follows:

Table IV

| Sample | Description | Potency (mcg./ml.) |
|---|---|---|
| I | Whole broth less mycelia, refrigerated until assayed. | 61 |
| II | Whole broth | 11 |
| III | Whole broth + 0.1% SLS | 59 |
| IV | Whole broth + 0.5% SLS | 59 |
| V | Whole broth adjusted to pH 10 | 0 |

Sample I represents the full potency of the whole fermentation broth at the conclusion of the fermentation cycle, while sample II represents the residual potency of the broth after the destruction of a part of the mitomycin by the mitase in the whole broth. As can be seen from the assay results, the two samples of the whole broth which contain 0.1% and 0.5% of sodium lauryl sulfate maintain substantially full potency, i.e., approximately equal to that of sample I. From this it is concluded that sodium lauryl sulfate is an effective mitase inhibiting agent and can be used to stabilize the activity of mitomycin in whole broth.

EXAMPLE V

The effectiveness of varying quantities of sodium lauryl sulfate in inhibiting mitase in whole fermentation broths was demonstrated by assaying the potency of various samples of mitomycin-containing broths obtained in the following manner: Samples I and II were portions of the whole broth taken at the time of harvest and produced as described in Example III. Sample III was whole broth identical to that of sample II to which there was added 0.1% sodium lauryl sulfate (by weight of the broth). Samples IV and V contained 0.01% and 0.001% of sodium lauryl sulfate respectively in whole broth, otherwise were identical to sample II. Samples II through V were incubated at 37° C. for one hour. All samples were submitted to differential assay using *Klebsiella pneumoniae* and *Bacillus subtilis* as the test organisms whereby the content of mitomycin A and mitomycin C was determined. The results are summarized in the following table:

Table V

| Sample | Description | Potency (mcg./ml.) | | |
|---|---|---|---|---|
| | | A | B | A+C |
| I | Whole broth, less mycelia, refrigerated until assayed. | 5 | 39 | 44 |
| II | Whole broth control | 0.8 | 5.7 | 6.5 |
| III | Whole broth with 0.1% SLS | 3 | 41 | 44 |
| IV | Whole broth with 0.01% SLS | 4 | 11 | 15 |
| V | Whole broth with 0.001% SLS | 5 | 10 | 15 |

From the results set forth in Table IV it is apparent that although some stabilization is achieved at a lower percentage, it is desirable to add about 0.1% sodium lauryl sulfate in order to preserve the major portion of the potency of the broth.

It is to be understood that the foregoing examples comprise various specific embodiments of the invention. The specific embodiments set forth in the specification are illustrative only and it is to be understood that the invention as described is susceptible of many variations and modifications which will readily occur to the skilled in the art and that all such variations and modifications are within the spirit and scope of the invention and of the appended claims.

We claim:

1. In a process for the production of mitomycin from a mitomycin-containing whole broth, the step of adding to the whole broth at least about 0.001% by weight of the whole broth of an alkali metal alkyl sulfate wherein the alkyl radical has from 8 to 18 carbon atoms.

2. In a process for the recovery of mitomycin from a mitomycin-containing whole broth, the step of adding about 0.1% by weight of the whole broth of sodium lauryl sulfate to the whole broth at the completion of the fermentation cycle whereby the destruction of mitomycin by mitase is substantially eliminated.

3. In a process for the recovery of mitomycin from a mitomycin-containing whole broth, the step of adding at least about 1% by weight of the whole broth of chloroform to the whole broth at the completion of the fermentation cycle whereby the destructive effect of mitase on mitomycin is substantially eliminated.

4. In a process for the recovery of mitomycin from a mitomycin-containing whole broth, the step of adding at least about 1% by weight of the whole broth of toluene to the whole broth at the completion of the fermentation cycle whereby the destructive effect of mitase on mitomycin is substantially eliminated.

5. In a process for the recovery of mitomycin from a mitomycin-containing whole broth, the step of adding at least about 0.025% by weight of the whole broth of mercuric chloride to the whole broth at the end of the fermentation cycle whereby the destructive effect of mitase on mitomycin is substantially eliminated.

6. In a process for the recovery of mitomycin C from a mitomycin C-containing whole broth, the step of adding about 0.1% by weight of the whole broth of sodium luaryl sulfate to the whole broth at the completion of the fermentation cycle whereby the destruction of mitomycin C by mitase is substantially eliminated.

7. In a process for the recovery of mitomycin C from mitomycin C-containing whole broth, the step of adding about 0.1% by weight with whole broth of sodium lauryl sulfate to the whole broth at the completion of the fermentation cycle whereby the destruction of mitomycin C by mitase is substantially eliminated.

References Cited in the file of this patent

UNITED STATES PATENTS 2,424,832 Koerber _____ July 29, 1947

OTHER REFERENCES

Wakaki et al.: Antibiotics and Chemotherapy, pp. 228–244, May 1958.

Hata et al.: J. of Antibiotics Ser. A, pp. 141–146, July 1956.